United States Patent
Schu

(10) Patent No.: US 7,469,846 B2
(45) Date of Patent: Dec. 30, 2008

(54) WET-MECHANICAL TREATMENT OF MIXED WASTE

(75) Inventor: Reinhard Schu, Walkenried (DE)

(73) Assignee: Ecoenergy Gesellschaft fur Energie—und Umwelttechnik mbH, Walkenried (DE)

( * ) Notice: Subject to any disclaimer, the term of this patent is extended or adjusted under 35 U.S.C. 154(b) by 148 days.

(21) Appl. No.: 10/579,810

(22) PCT Filed: Nov. 13, 2004

(86) PCT No.: PCT/DE2004/002518

§ 371 (c)(1),
(2), (4) Date: May 16, 2006

(87) PCT Pub. No.: WO2005/051547

PCT Pub. Date: Jun. 9, 2005

(65) Prior Publication Data

US 2007/0108406 A1     May 17, 2007

(30) Foreign Application Priority Data

Nov. 22, 2003 (DE) .................................. 103 54 627

(51) Int. Cl.
*B02C 23/14* (2006.01)
(52) U.S. Cl. ................. 241/21; 209/12.1; 209/13; 209/17; 210/605; 210/612; 210/806; 210/804; 210/768; 210/787; 210/295; 241/23; 241/24.14; 241/101.8
(58) Field of Classification Search ............... 209/12.1, 209/13, 17, 138; 210/603, 605, 612, 622, 210/651, 652, 806, 804, 767, 768, 787, 774, 210/205, 294, 295, 299; 241/19, 20, 21, 241/24.14, 24.15, 24.13, 24.12, 79, 79.1, 241/81, 101.8, 101.5, 23
See application file for complete search history.

(56) References Cited

U.S. PATENT DOCUMENTS 3,945,575 A * 3/1976 Marsh ......................... 241/20

FOREIGN PATENT DOCUMENTS

DE        3908185 A1 *  9/1990
DE     19617501 A1 * 11/1997

* cited by examiner

*Primary Examiner*—Mark Rosenbaum
(74) *Attorney, Agent, or Firm*—Andrew Wilford

(57) ABSTRACT

The invention relates to a method and device for the wet-mechanical treatment of a substance mixture, particularly of refuse of all types, comprised of inert substances, water and of organic substances having a water-soluble and bioconvertible portion, whereby water is used as a solvent, washing agent and separating agent. According to the invention: the substance mixture, with a set dry substance content of 15-25%, is firstly mixed; afterwards, a first inert heavy fraction with a particle size of >25 mm and a first organic light fraction with a particle size of 30-120 mm are subsequently separated out in a first stage with a dry substance content of 10-20%; in a second stage with a dry substance content of 6-12%, a second inert heavy fraction with a particle size of 3-30 mm separated out by gravity, and a second organic light fraction with a particle size of 3-30 mm is separated out by sieving and rinsing, and finally; in a third stage with a dry substance content of 3-8%, a third inert heavy fraction with a particle size <2 mm is separated out by centrifugal forces, and a third organic light fraction with a particle size of 150 ?m–3 mm is separated out by sieving and rinsing.

41 Claims, 2 Drawing Sheets

WET-MECHANICAL TREATMENT OF MIXED WASTE

CROSS REFERENCE TO RELATED APPLICATIONS

This application is the US national phase of PCT application PCT/DE2004/002518, filed 13 Nov. 2004, published 09 Jun. 2005 as WO 2005/051547, and claiming the priority of German patent application 10354627.8 itself filed 22 Nov. 2003, whose entire disclosures are herewith incorporated by reference.

FIELD OF THE INVENTION

The disposal of domestic waste as well as industrial waste is a problem due to the sustainability that is more and more required by regulations. After the reduction of the waste quantities by waste reduction and the introduction of the separate collection of valuable substances, waste remains that cannot be recirculated directly to utilization. As mixture of three material types of inert materials, organic material and water, they can be treated neither by mineral material utilization nor by biomass utilization due to too high a content of organic material and to high a content of water and/or minerals. Due to a too high pollution rate, draining as sewage water is not possible as well. For the disposal of such waste, the new legal provisions in Germany (Abfallablagerungsverordnung, waste dumping regulation) require neutralization before dumping. In the long term (by 2020), a complete utilization of all waste must be achieved according to a sustainable waste-management plan.

For effective utilization, different methods or treatment systems are available. Thus, an energy solution is achieved by fermentation, incineration or gasification. An important criterion for product quality in all energy-producing methods is a low content of mineral material, or inert material. The importance of the optimal product humidity and grain size is to be valuated differently. For fermentation, dry and wet fermentation methods as well as anaerobic sewage water purification methods are possible.

For utilization of the materials of the organic phase, agricultural utilization is most important, which is however limited by the pollution effect of the material. Forms of utilization as materials for the fibers as insulating material, paper or press plates are not discussed in detail herein.

For inert materials, there are ways of utilization in the construction industry or they are deposited in garbage dumps. Only a separation of the waste into fractions that can be utilized as materials or as energy enables an efficient utilization. This way also the separation as pre-treatment for preparing the utilization itself should meet demands of sustainability, i.e., conserving resources and avoiding emissions by simultaneously economic and social compatibility.

At present, the methods described in the following are available for the processing of waste containing organic fractions that can be distinguished in terms of pollution rate of the organic fractions:

Processing residual materials containing inoffensive organic fraction:

Composting:

Solid organic residual materials or sludge with added structure material are treated in an aerobic biological manner after sieving off coarse undesired materials. By biological treatment, organic substances are decomposed and converted and water content is reduced until stabilization is achieved. By this process, the plant availability is reduced and at the same time, the plant tolerance of the compost is increased. Unwanted materials are separated out during the coarse processing principally from the finished compost that has been dried in the composting process by hard material separation and air separation.

The hard material separation is in most cases conducted by means of pneumatic tables. The composting of organic waste materials entails high outgoing air emissions and high energy consumption.

Fermentation:

In anaerobic biological processing, in particular in wet fermentation methods, inert materials (sand) are separated out before fermentation. A post-rotting for the biological drying of dehydrated fermentation residue with or without added structure material is conducted in most fermentation methods before agricultural utilization. A characteristic of fermentation is the generation of regenerative energy from biogas and the reduction of the outgoing air emission in comparison to composting. The following technical fermentation variants of the methods have been put into practice in the commercial scale:

One-step and multiple step dry fermentation at 20%-50% dry substance content: From company catalogs and realized installations, among other the dry fermentation method Valorga, of the company Valorga, France; the Dranco method, company Organic Waste Systems nv, Belgium; dry fermentation Linde-BRV, Switzerland and the Kompogas method, company Kompogas, Switzerland are known. Substantial in these methods is that a separation of inert materials is not performed in most cases, or only after fermentation.

According to the WO 98/38145 A1, Frank Rindelaub, Switzerland, in a dry fermentation method a preceding inert material separation of a partial fraction is provided. In the installation La Coruna, Spain, which functions according to the so-called Valorga method, a dry inert material separation before the fermentation is carried out for protection of the fermentation plant using mechanical processing.

One-step and multiple-step wet fermentation at 5%-20% dry substance content: Wet fermentation methods for waste with preceding inert material separation are known from company catalogs from the companies, among others, Linde-KCA-Dresden GmbH, Dresden, Germany; MAT Müll-und Abfalltechnik GmbH, Munich, Germany; Avecon, Finland, as well as WABIO methods of the company EcoTec, Finland. Beside fermentation, the inert material separation, that is, the pre-treatment of the organic fraction before the fermentation is decisive.

Processing of residual materials containing a toxic organic fraction:

Most known methods for the processing of toxic organic fractions provide a disposal in a garbage dump or a garbage incineration plant. In Europe, according to current regulations, a stabilization of the organic fraction before dumping must be provided. This pre-treatment before disposal is achieved in mechanical-biological processing plants by composting and fermentation methods.

In case an energy utilization shall be achieved, drying an inert material separation of the mostly humid waste containing inert material is required.

Inert material separation methods can be carried out according to a wet or dry mechanical method. This way, wet separation, in which water is used as separating medium, has due to physical reasons a higher efficiency than dry separation, in which air is the separating medium.

Dry mechanical inert material separation methods after a biological drying are known from the dry stabilate method of the company HerHof Umwelttechnik GmbH, Solms-Niederbiel, Germany and DE 196 49 901 A1. Devices and methods for the wet-mechanical inert material separation are known from the documents DE 196 23 027 C1, DE 198 44 006 A1, DE 199 24 164 A1, DE 201 12 681 U1, DE 42 43 171 C1, DE 197 29 802 C2, DE 44 36 639 A1, DE 198 46 336 A1, DE 197 45 896 A1, DE 44 15 858 A1, DE 43 12 005 A1, DE 199 23 108 A1 and DE 41 20 808 A1.

Furthermore, there are particular methods for the processing of harbor mud and road sweepings, such as for example the installation ASRA in Hamburg Stellingen of the company Kupczik Umwelttechnik GmbH Hamburg and the MoReSa method of AKW Apparate und Verfahren GmbH, Hirschau, DE 196 17 501 C2.

The object of most of the foregoing methods is inert material separation. To this end, the waste to be separated at first is crushed and mixed, subsequently the inert materials are extracted from the total stream often in only one processing step. This has repeatedly entailed serious problems with the subsequent aggregates.

By an almost total reduction until defibration, e.g. by use of a pulper as in the documents DE 41 20 808 A1, DE 199 23 108 A1, DE 198 29 648 C2, DE 198 00 224 C1, DE 196 55 101 A1, DE 100 12 530 A1, DE 39 34 478, DE 198 07 116 A1, DE 4042 226 A1, DE 4042 225 A1, DE 4406 315 C2 and a foregoing cascade ball mill such as in document DE 102 10 467 A1 and DE 41 26 330 A1, the viscosity of the suspension is increased, which avoids an efficient separation. The viscosity is not decreased by decomposition of the organic material until the subsequent fermentation, so that undesired and operation-disturbing sedimentations of inert materials occur that the preceding separation could not cover due to the previously increased viscosity.

Other wet mechanical separation methods with minor crushing intensity before the material separation—see EP 0521 685 A2 and DE 197 55 223 A1, EP 567 184 B1—perform the inert material separation in one separation stage and according to DE 197 55 223 A1 even under stirring, so that the separation is very inexact.

In EP 0639 108 B1, a sedimentation operation with flow rate limitations that has also been carried out in different large-scale plants is proposed. Due to lack of a targeted outward transfer of sand, e.g. in a further separation stage, serious sedimentation problems in the following processing steps occurred.

Percolation methods such as in DE 198 46 336 A1, DE 196 48 731 A1, DE 199 09 353 A1, A 199 09 328 A1 and DE 198 33 624 A1 only eliminate fine inert materials that are washed out with the wash water or percolate, before or during percolation. Coarse inert material such as stones, glass and stoneware fragments that represent the highest inert material proportion in domestic waste are carried into the percolation and there cause an increased energy consumption and wear.

In all the aforementioned methods for inert material separation, in particular in the wet fermentation methods, the protection of the plants instead of the improvement of the material quality for later utilization is most important. The separation of waste should however assure the optimal utilization of the partial fractions as well as the technical and economic requirements concerning plant technology.

Indeed, the processing of the major portion of the organic material in all foregoing methods is obligatory, so that it is directly conveyed to an anaerobic processing or a foregoing hydrolysis with subsequent anaerobic processing of the hydrolysates. This way, the fact that the energy efficiency of fermentation compared to an incineration is a function of the parameter of anaerobic degradability, and the parameter of dry substance is not taken into consideration. The incineration of dry wood has a higher energy efficiency than the fermentation of dry wood. However it can be easily understood that the fermentation of wet organic industrial waste with high biogas yields has a higher energy efficiency than the incineration of this wet fraction.

Organic material, from which inert materials and soluble organic material have been removed to a large extent and that can be dehydrated by means of common screw presses to dry substance contents >45% dry substance, has a calorific value of about 6.000 kJ/kg and thus is close to auto-incineration. In case the proportion of anaerobic degradable organic material is below 50%, as e.g. in the case of screenings, from the economic point of view, the energy utilization by thermal processes such as incineration of gasification with or without previous drying is preferred to an anaerobic processing by fermentation for this material stream.

This problem is partially mentioned in EP 0 037 612 B1 and DE 196 00 711 A1. In the latter, washing the waste in a screw washer dissolves the organic material that is easily degradable. The easily degradable organic material is concentrated in the recirculated water that is conveyed to an anaerobic processor. Herein as well, the residence times of 2-8 hours (in DE 198 46 336 A1, 2-6 hours are mentioned) for washing the easily degradable organic material remain a problem. In practice, it has been shown that first of all an intensive washing with recirculated water, instead of long residence time, causes a high dissolution rate of easily degradable organic material, as described in the manufacturer and service catalog 1997/98, 9 Kasseler Abgallforum, M.i.C. Baeza-Verlag, page 12.

The increase of the residence time only exposes the waste to a longer mechanical treatment or dissolution. The hydrolysis, a particular kind of chemical or enzymatic cleaving of molecules by introduction of water that is catalyzed by bases or acids plays a minor role in this method, what is effective is rather the dissolution by means of water as solvent.

It has been recognized recently that sufficient hydrolysis of the organic fraction of the waste already occurs in the waste containers when the waste is collected and in the storage of the waste until processing. Often, 2-4 weeks pass between the waste formation and the processing, during which a natural hydrolysis occurs. A technical realization of this knowledge is not known from the prior art.

OBJECT OF THE INVENTION

With regard to the aforementioned methods for the processing of waste, the present invention has the object of generating fractions that can be utilized as materials and/or as energy and of doing this by avoiding to a large extent the dumping and by optimizing the separation process relative to flow rate, energy consumption, wear, investment costs and flexible further processing of the generated fractions.

SUMMARY OF THE INVENTION

In the method according to the invention, a three-component mixture consisting of water, inert material and three organic fractions as well as a liquid fraction that contains dissolved materials as well as very fine inert materials and fine organic particles, is separated in a three-stage separation plant.

The inert materials are purified according to economic and local circumstances with recirculated water and fresh water until they can be conveyed to a user. In particular in the coarse fraction of the inert materials, a utilization as material according to national legislation is questionable. This fraction can be dumped either directly or after a short deterioration phase for stabilization or can be conditioned in a further processing until it is usable. The organic fractions that have been separated out can be transferred directly to a drying, a composting or a fermentation stage.

In the method according to the invention (see FIG. 1), inert materials are separated out in multiple steps, beginning at a very high dry substance content. After the coarse stones (inert 1, FIG. 1) have been separated, the coarse organic (organic 1, FIG. 1), which then is accordingly cleaned of the stones of the respective sieve size, is sieved off and then, since it is coarse organic, can be rinsed easily until being cleaned of sand and adhering fine organic material by means of small quantities of water.

The fraction that is similar to screening material (organic 1) can then be pressed by means of simple press methods at low wear until having high dry substance contents. This is achieved by washing off all fine organic material that can only be pressed out with great difficulty and due to the washing-out of the stone structure or respectively the structure made of inert materials that otherwise absorbs the force of pressure without thereby contributing to a high dehydration rate. For improving the dissolution of organic material that is easily biodegradable, before the pressing, a crushing with the objective of liquid separation can be performed.

The first step is the most important step of the method.

By the high pressing-off rate of the coarse organic material (organic 1), already in this step of the method, the high structural material is separated out for energy utilization by incineration or gasification from the fermentable organic material that is in the press water. With a respective pressing in a first press step with common screw presses, a dehydration rate of about 45%-60% dry substance content can be expected.

In a second press step, this material (organic 1) can be pressed off to 60%-75% dry substance content.

The organic fraction (organic 1) can be turned into energy after the pre-treatment according to the invention directly or after a drying by incineration or gasification. Furthermore, the organic 1 can be employed in agriculture, when the respective limiting values concerning the utilization as materials are respected. This way it is important that beside the inert material separation and a respectively high pressing-off, the screenings are exposed to a batchwise drying. In this way, the drying should be conducted such that a sterilization by respective temperature control of the drying is achieved. After drying, the material should be cleaned of unwanted materials according to a compost fine processing and be pelletized, for good storability, transportability and plant tolerance of the material that later will be employed as dry fertilizer pellets.

After the coarse stones (inert 1) and the coarse organic material (organic 1) have been separated out from the suspension of materials, the dry substance content of the remaining suspension has considerably decreased. This decrease is caused by decantation of dry substance having high dry substance content as e.g. of the stones having a dry substance content >90% and the pressed-off organic material having a dry substance content of >45%. Furthermore, for rinsing the inert materials and for rinsing the organic material, additional water is employed that entails a further reduction of the dry substance content. From the remaining suspension, further inert materials are separated out in the second and third step of the method. In the second step, coarse and fine sand in the grain sizes of about 2-25 mm (inert 2, FIG. 1) is separated out. In the subsequent step, it is possible to sieve off the organic fraction via a fine sieve whose mesh aperture size is larger than the maximum size of the inert material that is to be separated out of about >3 mm (organic material 2, FIG. 1).

The sieved-off organic fraction (organic material 2) is also reached with water and pressed off. The sand (inert 2) that is separated out in this step is discharged by a sand separator, rinsed again with clear water so that according to the fresh water use either an inert material fraction capable of being dumped or a sand fraction capable of being utilized is produced.

In a final step, the third step of the method follows, in which now for the first time in the method, a pump is used.

Due to decantation of the different inert and organic fractions that are separated out in principally dry state, as well as by the quantities of circulation or respectively fresh water that have been supplied in total, the suspension that has been sieved at about 3 mm now has increased so much in terms of water content the along with the grain size <3 mm and the dry substance content between 3-8%, it is perfectly suitable for a subsequent classifying hydrocyclone.

The overflow of the hydrocyclone contains the remaining fine components of the organic material that are cleaned of fine minerals. The underflow of the hydrocyclone contains the separated-off inert materials, which due to their fineness still are partially contaminated with adhering organic material. These fine minerals can be brought to utilizable qualities (inert 3, FIG. 1) by means of a further processing, as for example by means of a sorting spiral or fine sieving with washing. The organic fraction of the sieve overflow is supplied to a fine sieving at about 50-500 µm. The filter cake (organic material 3, FIG. 1) that is formed during the fine sieving can as well be pressed off.

Additionally to the in total 6 fractions, recirculated water is formed that is enriched with dissolved organic material by the different pressing and washing operations.

Thus, a big part of the fermentable organic material is transferred into the recirculated water, whereas the structurally rich portion that is not fermentable so easily is contained in the pressed-off fraction. The recirculated water should now be conditioned for the reduction of the viscosity by means of a biological method. If the recirculated water was not treated, the viscosity could increase until the recirculated water can no longer be used as separating medium of the inert material separation. For the processing of the recirculated water, anaerobic sewage water purification methods, such as the solid bed fermentation method or respectively the submerse fermentation method with biomass retention can be employed.

Furthermore, a common fermentation of the recirculated water and the organic fraction by means of dry and wet fermentation processes for suspensions containing solid materials or percolation method is possible.

A better solubility of the organic material in the recirculated water can be achieved by a thermal conditioning by heating the suspension up to about 70° C. At the same time, it can however be observed that the press water contains a higher COD and a higher heavy metal reload. This effect is used by the present invention such that the pressed-off organic material that does not reach the fermentation step is decontaminated whereas the load can be transferred in a targeted manner to the liquid phase by a thermal conditioning.

Thus, the contaminated organic material is strongly reduced by a high fermentable portion of the dissolved organic material and simultaneously, the heavy metals are precipitated in the fermentation by a complexing in the organic material during the fermentation. The pollution load then can principally be found in the fermentation residue. The organic material after the fermentation, in case of a pure recirculated water fermentation thus in the method has the function of reducing the pollution.

The utilization as material of the organic fractions is principally carried out in agriculture as fertilizer and/or soil improver. The organic material therefore either is composted in composting plants or fermented in fermentation plants and composted and dried as well as pelletized and used as loose compost heaping or as fertilizing pellets. In the energy utilization, the organic is mechanically dehydrated to a large extent, dried if necessary and pelletized and utilized in gasification or incineration plants. For both ways of utilization, a pre-treatment according to the method according to the invention is advantageous.

The method according to the invention can be employed advantageously along with all existing mechanical-biological and thermal methods such as dry and wet fermentation methods, percolation method, hydrolysis methods, composting methods, aerobic and anaerobic sewage water purification methods, diaphragm separation methods for recirculated water purification, drying methods, pelletization methods as well as incineration methods with or without previous drying. Herein, also the retrofitting of existing plants as well is advantageous. The distribution of the compost of some composting plants for the utilization as material can no longer be assured due to the pollution load of the compost or the dumping due to national regulations. By means of a retrofitting with the method according to the invention, the pollution rates of the organic fractions can be reduced and at the same time, the energy utilization as biomass by separation of the inert materials and utilization of the composting for the drying of the organic fraction can be enabled.

The fractions inert 1, 2 and 3 shall preferably be used as materials in the construction industry. For the fractions inert 2 and 3, a utilization as material is possible in most mixtures of materials. The fraction inert 1 e.g. concerning the domestic waste does not always fulfil without further after-treatment the quality for the utilization as material and therefore has to be dumped on a garbage dump. Since the heavy materials have a relatively low biological activity, they correspond to most national criterions for the dumping of biologically stabilized waste on garbage dumps. In individual cases, a subsequent stabilization can be carried out.

Many organic industrial waste having a high content of organic material that is easily biodegradable often cannot be treated, due to the heavy material load and due to organic coarse materials, with simple anaerobic sewage water purification methods for biogas production. With the method according to the invention, the required pre-treatment can be carried out universally for all organic industrial waste known until the present day, from pomace to liquid manure over rumen contents. Mostly, a mixture for avoiding sedimentations in fermentation plants is not necessary.

The present invention accordingly is a universal method for the pre-treatment that enables independently of the pollution load of the waste a flexible further processing that is adapted to the local circumstances. The processing depth is function of financial and local circumstances and can have a modular structure. The adaptation of the plant technology to the future quality requirements of the fractions for the utilization and elimination as well as the future environment legislation should be possible by easy extension or conversion of the plant technology.

Furthermore, it should be possible to apply the plant technology for as many types of waste possible according to a local waste management. The present method as well as the present device are therefore suitable for the processing of, among others, domestic waste, bio-waste, organic industrial waste, liquid manure, road sweeping, contaminated soils and residual materials from communal and industrial sewage water purification.

BRIEF DESCRIPTION OF THE DRAWING

The method as well as the execution of the method by means of device according to the invention are schematically represented in the following drawings.

SPECIFIC DESCRIPTION

Figure 1:
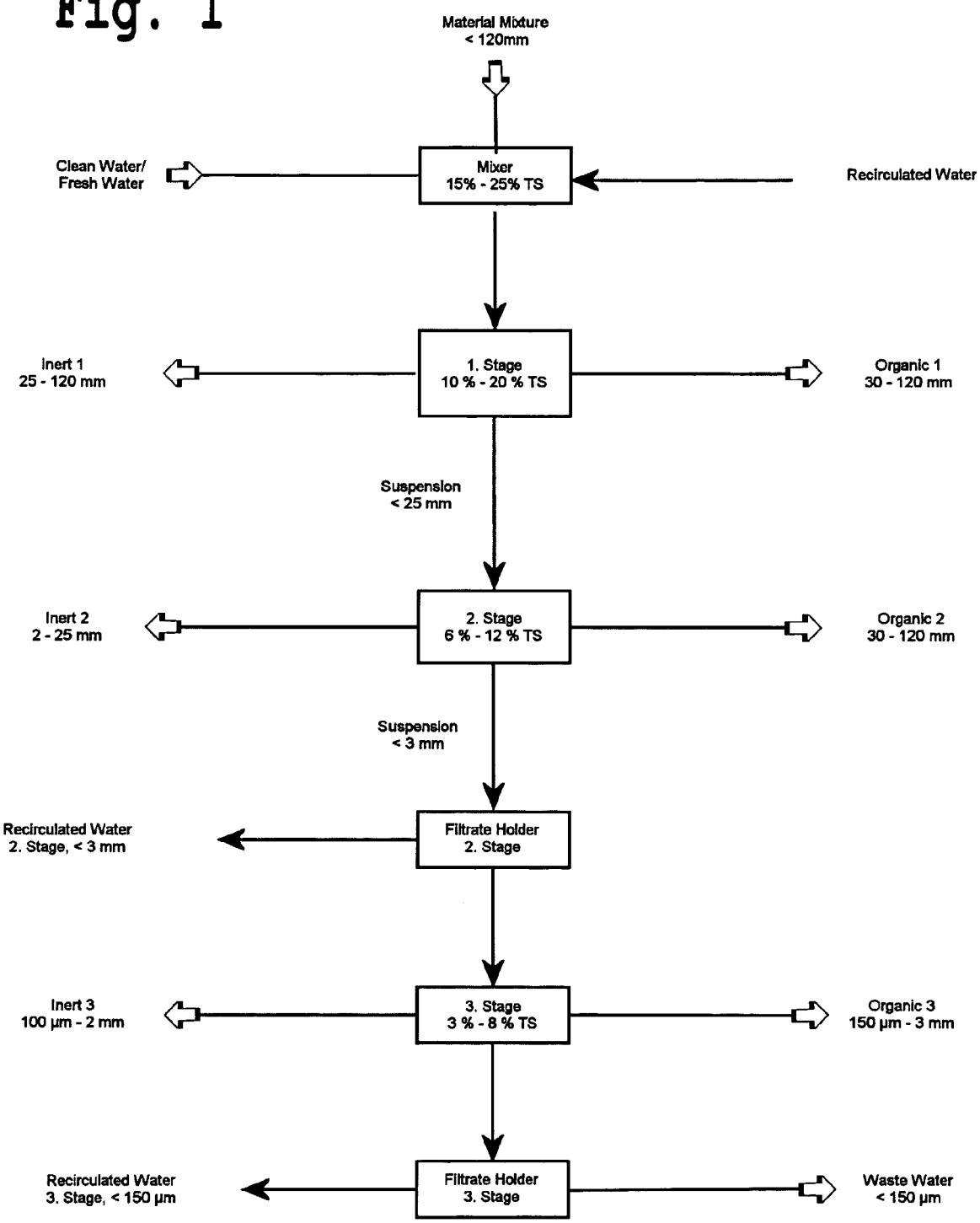
FIG. 1 shows in a diagram the altering composition of a mixture of materials in the individual steps or respectively steps of the method.

Concerning the steps of the method represented in FIG. 1, reference is made to the descriptions hereinabove.

Figure 2:
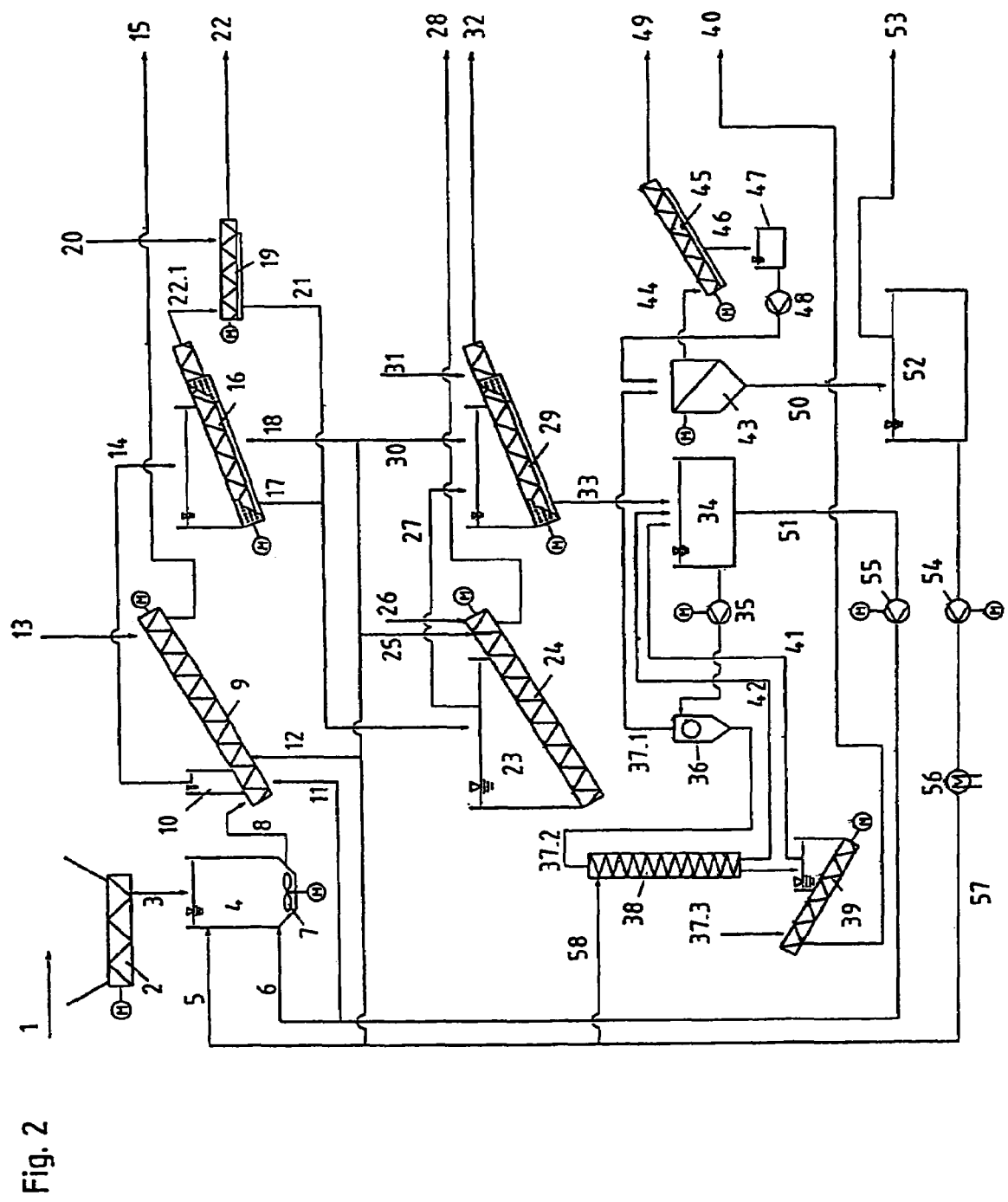
FIG. 2 shows an operation diagram of the method along with a device required for the execution.

In FIG. 2, the execution of the method is discussed in an exemplary manner on the basis of the illustrated device.

At first, the mixture of materials 1 that is to be processed is slightly crushed and defibered, so that separation is easier, since due to the low dissolution of fibers, the viscosity of the recirculated water is not increased unnecessarily. A fine crushing of the mixtures of materials before insertion into device according to the invention as well is not necessary in certain cases, since device is designed for a size of the particles of about 120 mm.

Subsequently, the mixture of materials 1 is conveyed into a mixer 4 via a dosing conveyor 2, preferably a spiral conveyor. This way the mixture of materials already is wetted in the spiral conveyor with recirculated water and is rinsed at the discharge into the mixer with recirculated water 5, 6 for avoiding obstructions.

The already wetted mixture of materials 3 reaches the mixer that is driven via a stirrer 7 from below. The rotational speed of the stirrer and the dry substance content in the mixer 4 are adjusted via the recirculated water supply dependent on the power consumption of the stirrer and the viscosity of the recirculated water such that the light materials are mixed in and leave the mixer along with the total of the suspension through a lower outlat via a conveyor 9 and the subsequent separation steps are optimized. The mixing in of the light materials is helped by the previous wetting by means of the dosing conveyor 2 and by a nozzle in the mixer that can be adjusted via multiple paddles.

First Step:

The suspension 8 reaches the conveyor 9 from the mixer 4. The conveyor is designed as a spiral conveyor having a minimum diameter of about 300 mm and a thread pitch of about 150 mm. The spiral conveyor trough is designed as U-trough and has a free section of about 150 mm above the screw. The spiral conveyor 9 is flanged at the lower area of the mixer 4 such that the heavy materials can slide into the screw over an angle of about 45°. The suspension is pressed by hydraulic pressure into the mixer into the underflow and thus reaches the sieving screw 16 via an upflow classifier 10. Before reaching the upflow classifier 10, the suspension slides along over the screw 9, the heavy materials not being carried away into the upflow classifier 10, but being transported away via the slowly turning screw 9. Since the sinking heavy materials still contain adhering and retained organic material, the screw 9 is rinsed in the area of the upflow classifier 10 with recirculated water 11 from the second step. The heavy materials that have been conveyed through the upflow classifier 10 by the spiral conveyor 9 are now rinsed again with the pure recirculated water 12 from the third step. In the area above the suspension level in the screw 9, the heavy materials are rinsed clear and are ejected from the system as first inert fraction 15 into a container or to another transfer point.

Due to the aforementioned cascade rinsing system, wherein following washing process uses ever clearer rinse water, a reduced consumption of purified circulation or respectively fresh water and higher residual material qualities can be achieved.

The light materials 14 that are discharged via the upflow classifier 10 are sieved with a sieving screw 16 at about 30 mm gap width. For avoiding floating supernatants, the suspension with the light materials of the sieving screw 16 is conveyed via a closed pipe portion. Floating materials thus are inevitably conducted, conveyed and sieved into the area of the screw blades of the sieving screw 16 below the level of the liquid. For improving the sieving result, the recirculated water 18 for the rinsing of the sieving screw 16 is added. In the rear part of the sieving screw, the light materials 22.1 are prepressed before the light materials 22.1 are transferred to a washing press 19. In the washing press, the light materials are rinsed with fresh water 20 or purified recirculated water and are dehydrated until reaching high dehydration rates of up to 60% dry substance content and are discharged into a container or transferred to a respective conveyor system as press cake or first organic fraction 22.

The sieved suspension 17 and press water 21 are conducted into a sedimentation basin 23 without pumps.

Second Step:

In the second step of the separation method, the suspension 17, 21 reaches a sedimentation basin 23 that is designed similar to an upflow classifier. The heavy materials slide down into the discharge screw 24, the light materials 27 reach a slotted hole sieving screw 29 via an overflow. In the sieving screw, the light materials are rinsed with recirculated water 30 from the third step, with fresh water 31 or purified recirculated water and are dehydrated until containing up to 45% dry substance. The dehydrated second organic fraction 32 is discharged into a container or transferred to a respective conveyor system.

The heavy materials that have been separated out in the discharge screw 24 are cleaned via a cascade rinsing system first with recirculated water 25 and then with purified recirculated water or fresh water 26 of light materials, rinsed and discharged as second inert fraction 28 into a dehydration container or a subsequent conveyor.

The sieved suspension 33 having a grain size of less than 3 mm is conducted into a filtrate vessel 34.

Third Step:

From the filtrate vessel of the second step, a suspension 51 that is capable of being pumped either is recirculated to the rinsing via a rotary pump 55 as recirculated water or is conveyed into a hydrocyclone 36 via a further rotary pump 35. The suspension 37.1 that is discharged via the plunger tube of the hydrocyclone still contains organic fibers and particles that can be sieved off, which are sieved via a vibration sieve 43 in two steps, first at about 200 μm and then at about 50 μm. For improving the sieving quality, the sieve can be rinsed. The sieving cake 44 that is statically pre-dehydrated to about 20% dry substance content is post-dehydrated via a screw press 45 to about 40% dry substance content and is carried out as press cake or third organic fraction 49. The press water 46 reaches a collection vessel 47 and then is recirculated to the sieve 43 via a pump 48. The sieved suspension 50 reaches the filtrate vessel 52 via gravity.

The heavy fraction 37.2 from the hydrocyclone underflow is post-purified via a sorting spiral 38. Due to the flow rates that have to be particularly adjusted in the sorting spiral 38, recirculated water 58 is added. The purified heavy fraction is conducted into a calming bath with sand discharge 39, whereas the heavy fraction 42 that is contaminated with organic material is recirculated to the hydrocyclone via the filtrate vessel 34 of the second step. The washing water 41 is as well led into the filtrate vessel 34 of the second step. The remaining heavy fraction is dehydrated after a washing operation with fresh water 37.3 via a screw 39 and discharged as third inert fraction 40.

The excess water is lead into a recirculated water purification system via an overflow from the filtrate vessel 52 of the third step as sewage water 53 that purifies the recirculated water until it can again be used as separation and washing water.

If necessary, the total system can be heated via a heat exchanger 56.

The invention claimed is:

1. A method for the wet mechanical processing of a mixture of materials using water as solvent, detergent and separating agent, the method comprising the steps of:
   continuously mixing the mixture of materials in a mixer with water as separating agent and detergent, without separating off compounds of the mixture, until a dry substance content of 15% to 25% is obtained,
   a) thereafter
      discharging the mixture of materials from the mixer by means of a conveyor,
      adding water to the mixture such that light components remain dissolved in a solid/liquid mixture having a dry substance content of 10% to 20% and heavy components settle and are separated by means of the conveyor as a first inert heavy fraction having a grain size of >25 mm,
      sieving off, rinsing, and pressing from the remaining solid/liquid mixture, organic light materials having a grain size of 30 to 120 mm as a first organic light fraction,
   b) thereafter separating by sieving and rinsing from the remaining suspension having an adjusted dry substance content of 6% to 12% first inert heavy materials having a grain size of 2-25 mm by gravity and subsequently further organic light materials having a grain size of 3 to 30 mm,
   c) thereafter separating from the remaining suspension having an adjusted dry substance content of 3% to 8% further inert heavy materials having a grain size of <2 mm by centrifugal forces and subsequently separating by sieving and rinsing further organic light materials having a grain size of 150 μm to 3 mm.

2. The method according to claim 1 wherein in steps a) to c) fresh water or recirculated water consisting of unprocessed and/or purified filtrate or respectively sewage water of step b) or c) is used as solvent, detergent or respectively separating agent.

3. The method according to claim 1, further comprising before step a) the steps of
   conveying the mixture of materials into the mixer by means of a dosing conveyor and
   adding water to the mixture in the conveyor for improving the wetting ability of the mixture of materials and for pre-mixing.

4. The method according to claim 1 wherein in step a) discharge from the mixer is separated by means of a spiral conveyor that has a sufficient free section area in an upper part, so that a portion principally consisting of light materials is directly carried away into an upflow classifier above the screw and that another portion principally consisting of heavy materials is further cleaned of light materials by means of rinsing water and is discharged via the spiral conveyor.

5. The method according to claim 4 wherein in step a) the light materials are transferred outward into a sieve via hydraulic pressure caused by a fill level in the mixer, pressure created by rinsing water pumps as well as by a fresh water supply via the upflow classifier.

6. The method according to claim 5 wherein in step a), the light materials are rinsed with purified filtrate of step c) or with fresh water during sieving.

7. The method according to claim 6 wherein in step a) the sieved light materials are dehydrated by a single-step or multiple-step mechanical dehydration.

8. The method according to claim 7 wherein the light materials are crushed before being pressed so that a higher dehydration rate of biogenous organic compounds can be achieved.

9. The method according to claim 4 wherein in step a) the heavy materials in the conveyor are rinsed with filtrate of step b) and purified filtrate of the third step as well as with fresh water in a cascaded manner such that settling heavy materials are cleaned of dissolved organic material, light materials and finer heavy materials.

10. The method according to claim 9 wherein in step a), compressed air is additionally employed for rinsing the heavy materials in the conveyor.

11. The method according to claim 9 wherein the inert heavy materials that have been discharged in step a) are dumped directly or after a rotting or deterioration.

12. The method according to claim 9 wherein the inert heavy materials that have been discharged in step a) are crushed via a breaker and after the crushing are either added to the mixture of materials of step b) when crushed to less than 15 mm or the mixture of materials of step c) or when crushed to less than 3 mm for further purification, wherein before the crushing, metals are separated out by a metal separator.

13. The method according to claim 1 wherein filtrates of step a) are conveyed into a sedimentation basin of step b) due to the hydraulic pressure.

14. The method according to claim 13 wherein in step b) filtrates of step a) are rinsed in a conveyor with air or with a filtrate from step c) or with fresh water in a cascaded manner, wherein further heavy materials are cleaned of dissolved organic material, light materials and finer adhering heavy materials.

15. The method according to claim 14 wherein light materials are carried away from the sedimentation basin via an overflow to a sieve where they are sieved, rinsed and pressed.

16. The method according to claim 15 wherein light materials that have been separated out via the sieve are dehydrated by a single-step or multiple-step mechanical dehydration.

17. The method according to claim 1 wherein a filtrate of step b) at first is conveyed into a filtrate vessel and therefrom is conveyed into a hydrocyclone in step c), by means of which, according to dry substance content and viscosity of the filtrate, heavy materials of a grain size up to 50-150 μm are separated out.

18. The method according to claim 17 wherein an underflow of the hydrocyclone is classified and washed by a sorting spiral by addition of recirculated water, wherein the purified heavy fraction is washed and dehydrated via a sedimentation basin having a screw discharge by rinsing with fresh water as well as the heavy fraction that is loaded with organic material and the washing water is recirculated into the filtrate vessel of step b).

19. The method according to claim 17 wherein the underflow of the hydrocyclone is washed and dehydrated via a vibration sieve with fresh water rinsing.

20. The method according to claim 17 wherein overflow of the hydrocyclone is conveyed to a vibration sieve from which sieved-off particles are rinsed with fresh water or filtrate and pre-thickened filter cake is dehydrated mechanically via a screw press and pressed-out water is recirculated into the vibration sieve.

21. The method according to claim 20 wherein filtrate from the vibration sieve is processed in an aerobic manner or in an anaerobic manner and subsequently recirculated into the process.

22. The method according to claim 21 wherein filtrate is conveyed into a further filtrate vessel wherein a residence time of the filtrate in this vessel as well as a residence time of the filtrate of step b) in the filtrate vessel upstream of the hydrocyclone by a respective dimensioning of the vessels is selected such that the filtrates are hydrolized.

23. The method according to claim 22 wherein a partial stream of filtrate from the filtrate vessel is purified via an anaerobic sewage treatment and a purified discharge from the sewage treatment is re-used as recirculated water in the process such that with a low pH of the recirculated water a higher solubility of the organic fraction can be achieved.

24. The method according to claim 21 wherein filtrate of step c) that has been processed in an aerobic or anaerobic manner is cleaned of pollutants or of salts before being recirculated into the process as recirculated water via microfiltration, nanofiltration or reverse osmosis systems, such that the purified recirculated water reduces the pollutant concentration of the mixture of materials in the process.

25. The method according to claim 21 wherein the recirculated filtrate is heated up to 30-85° before recirculation into the process via a heat exchanger for improving separating performance of the total system, dehydration rate of the organic fraction, solubility of the fermentable organic material and sterilization of the individual fractions as well as for setting a temperature of 35° or 55° that is required for the fermentation of sewage water or of light material fractions.

26. The method according to claim 21 wherein for fermentation of the sewage water as well as of light material fractions, a dry or wet fermentation process is employed.

27. The method according to claim 26 wherein the light material fractions that have been separated out in steps a) to c) during the fermentation are adjusted to a predetermined dehydration rate and they are then crushed.

28. The method according to claim 1 wherein the light material fractions that have been separated out in steps a) to c) are conveyed into a hydrolizer or a percolator, whereby the light materials after hydrolysis or the percolation have better mechanical dehydration properties.

29. The method according to claim 1 wherein the light materials that have been separated out during the first to step c) are dehydrated principally mechanically or are thermally or thermally-biologically after-treated and dried for energy utilization or utilization as material in the form of a dry fertilizer.

30. The method according to claim 29 wherein the thermally dried light material fractions are used as dry fertilizer pellets after a pelletization for the improvement of plant tolerance.

31. The method according to claim 29 wherein the dried light fractions are employed as pelletization auxiliary means for pelletization of substitute combustibles as packaging waste or reprocessed sieve overflow from mechanical-biological processing plants, whereby at the same time thermal stability of the combustible pellets in shaft gasification methods is improved.

32. The method according to claim 1 wherein sludge from the aerobic and anaerobic recirculated water processing is utilized due to a remaining pollution load separately from the purified light material fractions.

33. The method according to claim 1 wherein very fine heavy materials that remain in the filtrate after step c) and remaining very fine material are separated along with the sludge from the purification of the recirculated water.

34. The method according to claim 1 wherein control of the quantities of the circulation, fresh and sewage waters is effected depending on the viscosity of the recirculated water and the current consumption of the mixer.

35. A device for performing the method according claim 1, the device consisting of the serial connection of:
- a dosing conveyor, a mixer, a spiral conveyor, an upflow classifier, a sieving device and a press;
in step a) of the method
- a sedimentation basin, a screw discharge, a sieving device and a filtrate vessel; and
in step b) of the method
- a rotary pump, a hydrocyclone, a vibration sieve and a screw press, as well as, upstream of the hydrocyclone, a sorting spiral, a calming bath with sand discharge, in step c) of the method
- from the remaining suspension having an adjusted dry substance content of 3% to 8% further inert heavy materials having a grain size of <2 mm are separated out by centrifugal forces and subsequently further organic light materials having a grain size of 150 μm to 3 mm are separated by sieving and rinsing.

36. The device according to claim 35 wherein the dosing conveyor of step a) of the method is a spiral conveyor.

37. The device according to claim 35 wherein the mixer of step a) of the method is designed as a standing vessel having a stirrer that is driven from below, wherein discharge of the suspension is in a lower area of the mixer.

38. The device according to claim 35 wherein the spiral conveyor of step a) of the method has a maximum diameter of 300 mm and a thread pitch of about 150 mm as well as in an upper area a free flow cross section of about 150 mm.

39. The device according to claim 35 wherein the sieving device of step a) of the method is a sieving screw that beside the function of sieving and washing also presses the light materials.

40. The device according to claim 35 wherein the press of step a) of the method consists of one or more screw presses.

41. The device according to claim 35 wherein the sedimentation basin of step b) is a sand classifier.

* * * * *